(12) United States Patent
Komatsu et al.

(10) Patent No.: US 6,930,645 B2
(45) Date of Patent: Aug. 16, 2005

(54) AUTOMOTIVE ON-BOARD ANTENNA

(75) Inventors: Satoru Komatsu, Saitama (JP);
Hiroshi Kuribayashi, Saitama (JP);
Tomoyuki Fukumaru, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 5 days.

(21) Appl. No.: 10/772,266

(22) Filed: Feb. 6, 2004

(65) Prior Publication Data

US 2004/0155825 A1 Aug. 12, 2004

(30) Foreign Application Priority Data

Feb. 7, 2003  (JP) ..................................... P.2003-030817

(51) Int. Cl.$^7$ ................................................. H01Q 1/32
(52) U.S. Cl. ...................................................... 343/713
(58) Field of Search ............................... 343/704, 711, 343/712, 713

(56) References Cited

U.S. PATENT DOCUMENTS 5,568,156 A * 10/1996 Terashima et al. .......... 343/713
6,211,832 B1 *  4/2001 Endo et al. .................. 343/713
6,292,150 B1 *  9/2001 Doi et al. .................... 343/713

FOREIGN PATENT DOCUMENTS

JP          09-130124         5/1997

* cited by examiner

*Primary Examiner*—Tho Phan
(74) *Attorney, Agent, or Firm*—Arent Fox, PLLC.

(57) ABSTRACT

An automotive on-board antenna includes a diversity system for performing diversity transmission and reception by a front plane antenna 11 using a windscreen of a vehicle as a dielectric substrate and a rear plane antenna 12 using a rear window glass as a dielectric substrate.

7 Claims, 5 Drawing Sheets

AUTOMOTIVE ON-BOARD ANTENNA

BACKGROUND OF THE INVENTION

The present invention relates to an automotive on-board antenna.

Conventionally, there is known an on-glass antenna which constitutes a diversity system by a plurality of individual antenna wires which are provided on, for example, an automotive window glass (for example, refer to Patent Literature No. 1).

[Patent Literature No. 1]

JP-A-9-130124

In the on-glass antenna that is described above as one example of the related art, however, since the plurality of independent antenna wires are simply provided on the surface of the same window glass, even if the diversity system is constituted by these antenna wires, there may be caused a risk that it becomes difficult to improve the sensitivity characteristics of the system in all peripheral directions of a vehicle (for example, in all peripheral direction around a vertical axis of the vehicle) and a direction along an elevation angle.

SUMMARY OF THE INVENTION

The invention is made in view of the situations, and an object thereof is to provide an on-board antenna which can improve the sensitivity characteristics of the system in all peripheral directions of a vehicle and a direction along an elevation angle while suppressing the infliction of a detrimental effect on its capability of being installed on the vehicle by preventing the automotive on-board antenna not only from disrupting the vision of occupants in the vehicle but also from damaging the external appearance of the vehicle.

With a view to solving the problem so as to attain the object, according to a first aspect of the invention, there is provided an automotive on-board antenna which has a plurality of antennas provided on surfaces of a plurality of window glasses of a vehicle, comprising a first antenna (for example, a front plane antenna in an embodiment) comprising, in turn, a first radiation element (for example, a first radiation conductor 21 in the embodiment) provided on the same surface of one window glass (for example, a windscreen 2 in the embodiment) of the plurality of window glasses and a first grounding conductor (for example, a first grounding conductor 22 in the embodiment) which surrounds a periphery of an outer edge portion of the first radiation element at a position spaced away outwardly from the outer edge portion of the first radiation element, and a second antenna (for example, a rear plane antenna 12 in the embodiment) comprising, in turn, a second radiation element (for example, a second radiation conductor 31) provided on the same surface of the other window glass (for example, a rear window glass 3 in the embodiment) of the plurality of window glasses and a second grounding conductor (for example, a second grounding conductor 32 in the embodiment) which surrounds a periphery of an outer edge portion of the second radiation element at a position spaced away outwardly from the edge portion of the second radiation element.

According to the automotive on-board antenna that is constructed as is described above, by constituting the automotive on-board antenna by the antennas provided on the plurality of window glasses, the sensitivity characteristics of the respective antennas can be used effectively so as to improve the sensitivity characteristics of the automotive on-board antenna relative to all peripheral directions of the vehicle (for example, all peripheral directions around a vertical axis of the vehicle).

Furthermore, according to a second aspect of the invention, there is provided an automotive on-board antenna as set forth in the first aspect of the invention, wherein at least either of the first radiation element and the second radiation element is provided with an inner cut-out portion (for example, an inner cut-out portion 23 in the embodiment) for allowing the surface of the associated window glass to be exposed therethrough.

According to the automotive on-board antenna that is constructed as is described above, by providing the inner cut-out portion in the interior of each radiation element, a resonant frequency can be decreased further while securing a desired sensitivity characteristic when compared with a radiation element with no inner cut-out portion being provided therein, whereby, in securing a desired resonant frequency for each radiation element having the inner cut-out portion provided therein, the radiation element can be made smaller in size than the radiation element with no inner cut-out portion being provided therein, that is, the area of each radiation element on the surface of the window glass of the vehicle which is regarded as a dielectric substrate can be decreased.

Namely, since the sizes of the surface areas of the respective radiation elements on the surfaces of the dielectric substrates are set according to wave lengths of target radio waves for the respective radiation elements, the sizes of the surface areas of the respective radiation elements can be decreased while a reduction in resonant frequency attributed to the provision of the inner cut-out portion being compensated for.

This can prevent the automotive on-board antenna not only from disrupting the vision of the occupant in the vehicle but also from damaging the external appearance of the vehicle while desired sensitivity characteristics being secured.

Furthermore, according to a third aspect of the invention, there is provided an automotive on-board antenna as set forth in the first aspect of the invention, wherein the plurality of window glasses include a windscreen and a rear window glass.

According to the automotive on-board antenna constructed as is described above, the first antenna and the second antenna can be disposed at different positions in terms of space and the elevation angle characteristics of the first antenna and the second antenna can be set so as to exhibit different characteristics.

This can improve further the sensitivity characteristics of the automotive on-board antenna relative to all peripheral directions of the vehicle (for example, all peripheral directions of a vertical axis of the vehicle), in the event that the sensitivity characteristics of the respective antennas are used effectively.

According to a fourth aspect of the invention, there is provided an automotive on-board antenna as set forth in the second aspect of the invention, wherein at least either of the first radiation element and the second radiation element which is provided with the inner cut-out portion is provided on the surface of the windscreen of the plurality of window glasses.

According to the automotive on-board antenna constructed as is described above, the disruption of the vision of the occupant in the vehicle can assuredly be prevented while desired sensitivity characteristics being secured by disposing at least either of the radiation elements the size of the surface area of which can be decreased by providing the inner cut-out portion on the windscreen of the plurality of window glasses of the vehicle which is required to meet a relatively stringent requirement for securing a certain degree of vision for the occupant in the vehicle which is set therefor.

According to a fifth aspect of the invention, there is provided an automotive on-board antenna as set forth in any of the first to fourth aspects of the invention, wherein the first antenna and the second antenna are provided on the outer edge portions of the window glasses associated therewith, respectively.

According to the automotive on-board antenna constructed as is described above, the disruption of the vision of the occupant in the vehicle can be prevented more assuredly while desired sensitivity characteristics being secured.

According to a sixth aspect of the invention, there is provided an automotive on-board antenna as set forth in any of the first to fifth aspects of the invention, wherein the first antenna and the second antenna are disposed at vertically upper portions of the window glasses associated therewith, respectively.

According to the automotive on-board antenna constructed as is described above, the disruption of the vision of the occupant in the vehicle can be prevented more assuredly while desired sensitivity characteristics being secured.

According to a seventh aspect of the invention, there is provided an automotive on-board antenna as set forth in any of the first to sixth aspects of the invention, wherein the first antenna and the second antenna constitute a diversity system for performing diversity transmission and reception.

According to the automotive on-board antenna constructed as is described above, the sensitivity characteristics of the automotive on-board antenna relative to all peripheral directions of the vehicle (for example, all peripheral directions of a vertical axis of the vehicle) can be improved by making effective use of the sensitivity characteristics of the respective antennas.

DETAILED DESCRIPTION OF THE PREFERRED EMBODIMENTS

Referring to the accompanying drawings, one embodiment of an automotive on-board antenna according to the invention will be described below.

Figure 1:
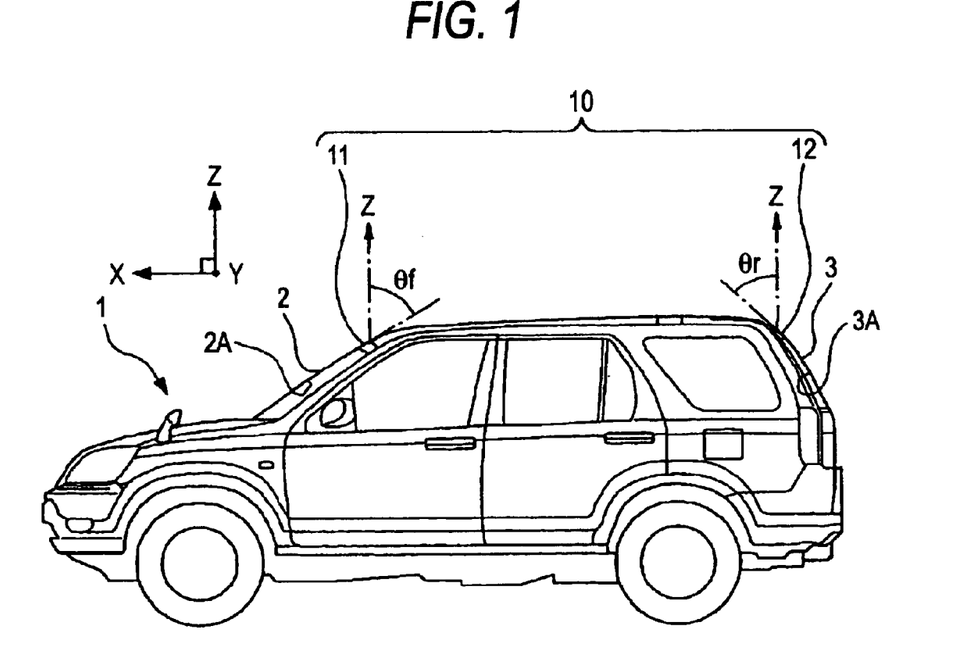
FIG. 1 is a side view of a vehicle on which an automotive on-board antenna according to an embodiment of the invention is installed.
Figure 2:
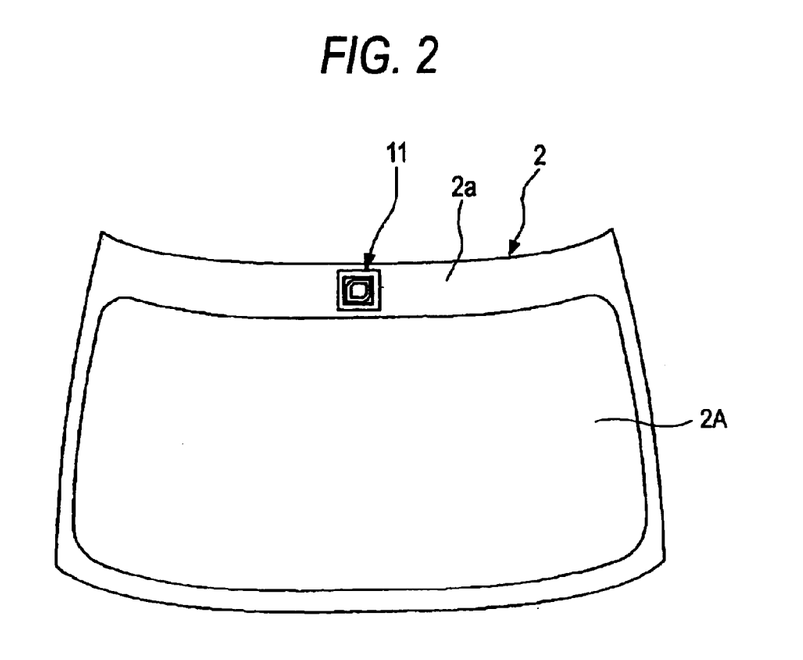
FIG. 2 is a plan view of a windscreen showing a position where a front plane antenna of the automotive on-board antenna shown in FIG. 1 is disposed.
Figure 3:
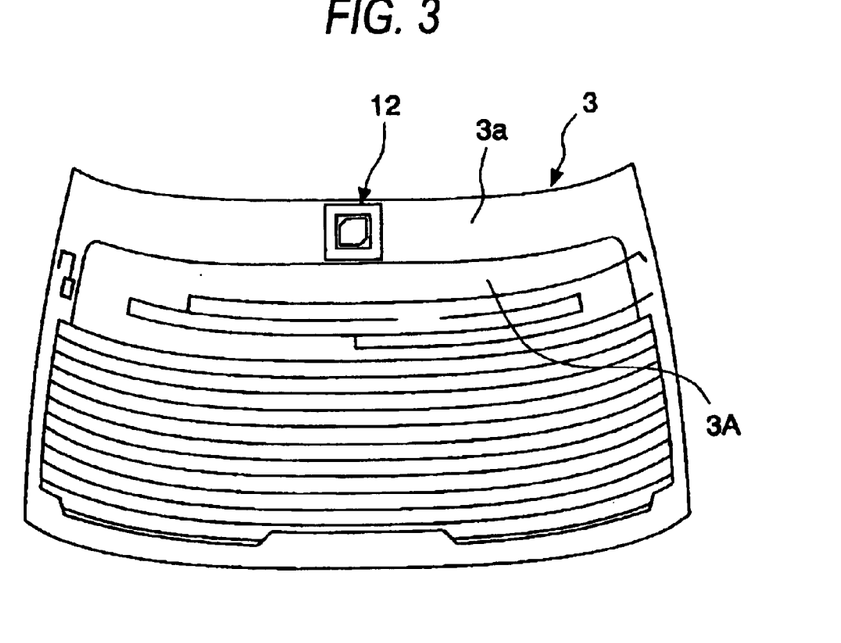
FIG. 3 is a plan view of a rear window glass showing a position where a rear plane antenna of the automotive on-board antenna shown in FIG. 1 is disposed.

An automotive on-board antenna 10 includes, for example, as shown in FIGS. 1 to 3, a front plane antenna 11 disposed on a passenger compartment-side inner surface 2A of a front window glass or windscreen 2 at a vertically upper portion in a circumferential edge portion 2a of the windscreen 2 in such a manner as to intersect in, for example, a vertical direction and a rear plane antenna 12 disposed on passenger compartment-side inner surface 3A of a rear window glass 3 at a vertically upper portion in a circumferential edge portion 3a of the rear window glass 3 in such a manner as to intersect at, for example, a different angle from that of the front plane antenna 11 in a vertical direction.

Then, this automotive on-board antenna 10 may be, for example, a GPS antenna used in receiving a positioning signal from a GPS (Global Position System) communications network for determining the position of a vehicle by making use of an artificial earth satellite or transmitting an emergency message by making use of positional information from the GPS, for example, a DSRC antenna used in receiving data distributed from various types of information providing services or implementing a process of automatic toll collection through a narrow area radio communications or Dedicated Short Range Communications (DSRC) between roadside ratio equipment and on-board radio equipment, for example, an antenna for receiving data distributed from broadcasting and/or various types of information providing services which utilize an artificial earth satellite, or, for example, a mobile communications antenna used for mobile communications between an artificial earth satellite or appropriate base station and the vehicle.

Figure 4A:
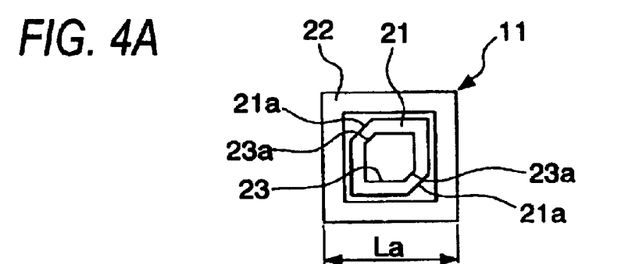
FIG. 4A is a plan view of the front plane antenna.
Figure 5A:
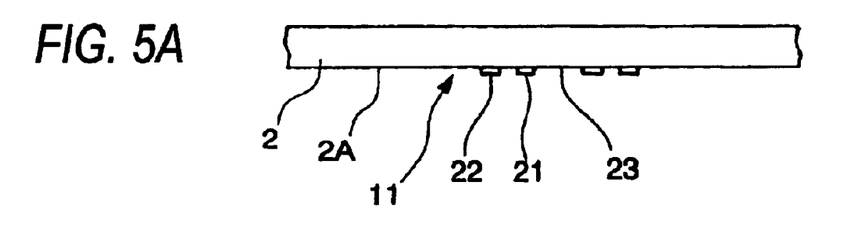
FIG. 5A is across-sectional view of the front plane antenna.

With the windscreen 2 functioning as a dielectric substrate, the front plane antenna 11 includes, for example, as shown in FIGS. 4A and 5A, a first radiation conductor 21 comprising a conductive film disposed on the passenger compartment-side inner surface 2A of the windscreen 2 and a grounding conductor 22.

The first radiation conductor 21 is formed such that, in a substantially quadrangular conductive film having two pairs of opposing sides, for example, a pair of corner portions of two pairs of opposing corner portions which are formed by two adjacent sides which intersect each other substantially at right angles is cut so as to form substantially linear perturbative portions 21a, 21a, so that a circularly polarized wave mode is generated by these perturbative portions 21a, 21a.

Furthermore, an inner cut-out portion 23, which is made to be a through hole, is provided in the interior of the first radiation conductor 21, so that the passenger compartment-side inner surface 2A of the rear windscreen 2 is exposed through the inner cut-out portion 23, and the first radiation conductor 21 is formed into a substantially annular shape which is completed when end portions of a belt-like conductor of a predetermined width, for example, are connected together.

Here, an inner edge portion of the inner cut-out portion 23 is formed so as to have a configuration which follows an outer edge portion of the first radiation conductor 21 at a position spaced away inwardly a predetermined widthwise distance from the outer edge portion.

Due to this, substantially linear corner portions 23a, 23a which follow, respectively, the pair of substantially linear perturbative portions 21a, 21a formed on an outer edge portion of the radiation conductor 21 are formed at a pair of corner portions of two pairs of opposing corner portions on an inner edge portion of the inner cut-out portion 23.

Then, the first radiation conductor 21 is connected to an appropriate feeding line (not shown) so that an appropriate high-frequency electric current is fed thereto.

The grounding conductor 22 is formed into a substantially quadrangular annular conductive film and is connected to an appropriate ground wire (not shown) so as to be grounded at all times. The grounding conductor 22 is disposed so as to surround the perimeter of the outer edge portion of the first radiation conductor 21 provided on the passenger compartment-side inner surface 2A at a position spaced away outwardly from the outer edge portion of the first radiation conductor 21.

According to this construction, the passenger compartment-side inner surface 2A of the windscreen 2 which is made to function as the dielectric substrate is exposed between the outer edge portion of the first radiation conductor 21 and an inner edge portion of the grounding conductor 22, and the front plane antenna 11 is made to function as an antenna when a so-called resonance circuit is formed between the first radiation conductor 21 and the grounding conductor 22.

Figure 4B:
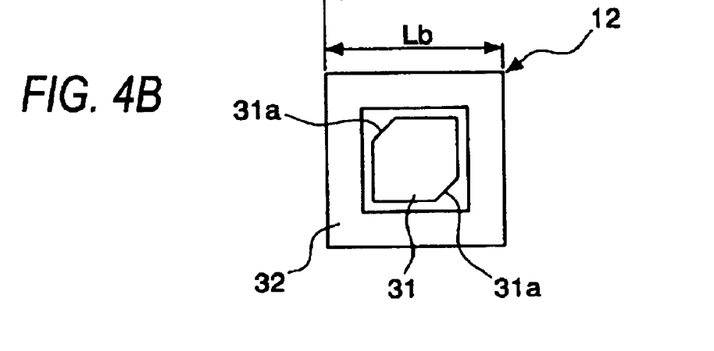
FIG. 4B is a plan view of the rear plane antenna.
Figure 5B:
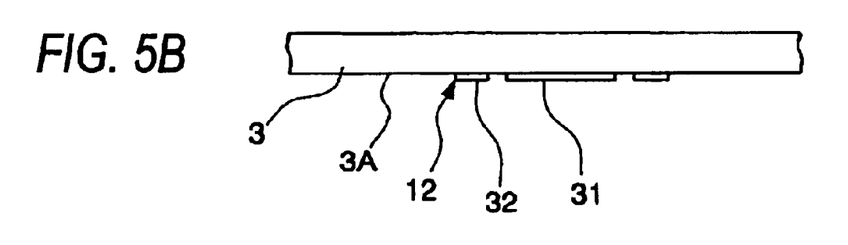
FIG. 5B is a cross-sectional view of the rear plane antenna.

The rear plane antenna 12 includes, for example, as shown in FIGS. 4B and 5B, a second radiation conductor 31 comprising a conductive film disposed on the passenger compartment-side inner surface 3A of the rear window glass 3 and a grounding conductor 32.

The second radiation conductor 31 is formed such that, in a substantially quadrangular conductive film having two pairs of opposing sides, for example, a pair of corner portions of two pairs of opposing corner portions which are formed by two adjacent sides which intersect each other substantially at right angles is cut so as to form substantially linear perturbative portions 31a, 31a, so that a circularly polarized wave mode is generated by these perturbative portions 31a, 31a.

Then, the second radiation conductor 31 is connected to an appropriate feeding line (not shown) so that an appropriate high-frequency electric current is fed thereto.

The grounding conductor 32 is formed into a substantially quadrangular annular conductive film and is connected to an appropriate ground wire (not shown) so as to be grounded at all times. The grounding conductor 32 is disposed so as to surround the perimeter of an outer edge portion of the second radiation conductor 31 provided on the passenger compartment-side inner surface 3A at a position spaced away outwardly from the outer edge portion of the second radiation conductor 31.

According to this construction, the passenger compartment-side inner surface 3A of the rear window glass 3 which is made to function as a dielectric substrate is exposed between the outer edge portion of the second radiation conductor 31 and an inner edge portion of the grounding conductor 32, and the rear plane antenna 12 is made to function as an antenna when a so-called resonance circuit is formed between the second radiation conductor 31 and the grounding conductor 32.

Here, by setting the antenna properties of the front plane antenna 11 and the second plane antenna 12 such as the resonant frequency and frequency band of a target radio wave to be transmitted and received to desired equivalent values, the permitivities of the windscreen 2 and the rear window glass 3 which are made to function as the dielectric substrates, respective lengths of the two pairs of opposing sides of the first radiation conductor 21 and the second radiation conductor 31 and the distances between the outer edge portions of the first radiation conductor 21 and the second radiation conductor 31 and the inner edge portions of the respective grounding conductors 22, 32 are set to appropriate values.

For example, in an attempt to secure a desired resonant frequency, the respective lengths of the two pairs of opposing sides of the first radiation conductor 21 are set to lengths which are smaller by predetermined extents than the respective lengths of the two pairs of opposing sides of the second radiation conductor 31 which is provided with no inner cut-out portion 23.

Namely, by providing the inner cut-out portion 23 in the interior of the first radiation conductor 21, the resonant frequency can be decreased when compared to a case where no inner cut-out portion 23 is provided in a radiation conductor having the same external size as that of the first radiation conductor 21.

According to this construction, as shown in FIGS. 4A, 4B, a decrease in resonant frequency that would be attributed to the provision of the inner cut-out portion 23 in the front plane antenna 11 can be compensated for by setting the external size (for example, the respective lengths La of the two pairs of opposing sides) of the front plane antenna 11 comprising the first radiation conductor 21 which is provided with the inner cut-out portion 23 smaller than the external size (for example, the respective lengths Lb of two pairs of opposing sides) of the rear plane antenna 12 which is set to secure a desired resonant frequency with the second radiation conductor 31 which is provided with no inner cut-out portion 23.

Figure 6:
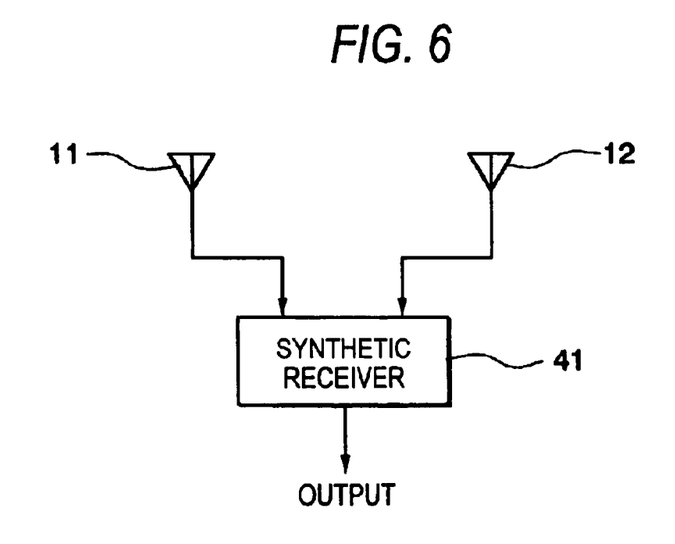
FIG. 6 is a functional block diagram of the automotive on-board antenna constituting a diversity system.

The automotive on-board antenna 10 constitutes a diversity system for implementing diversity transmission and reception with the front plane antenna 11 and the rear plane antenna 12 which are disposed at the different positions in terms of space and which have the different elevation angles, and for example, as shown in FIG. 6, reception signals outputted from the respective plane antennas 11, 12 enter a synthetic receiver 41.

The synthetic receiver 41 performs a synthesis of output relative to reception signals inputted from the respective plane antennas 11, 12 through, for example, a selection synthesis reception process for selecting a reception signal having a highest reception level and switching thereto, for example, a gain synthesis reception process for synthesizing a plurality of reception signals in the same phase, and for example, a maximum ratio synthesis reception process for controlling phases of a plurality of reception signals so as to become the same phase and synthesizing them by implementing weighting according to the reliability and reception levels of the reception signals and reduces the variation in reception level of radio waves.

Figure 7A:
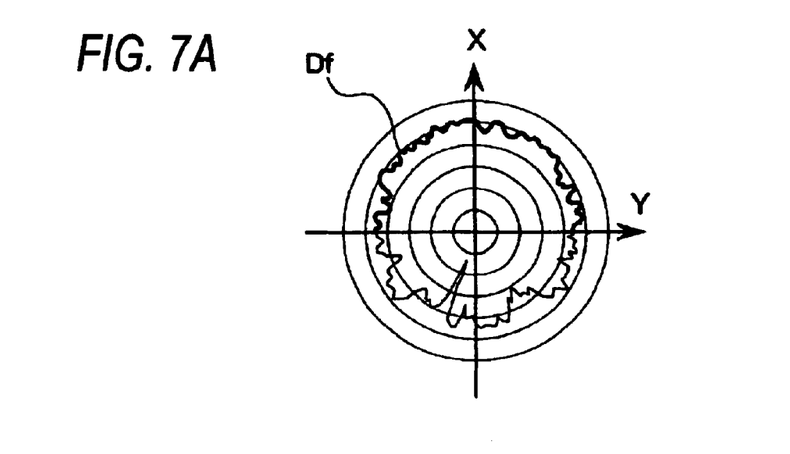
FIG. 7A is a graph showing a sensitivity distribution of the front plane antenna around a vertical axis.
Figure 7B:
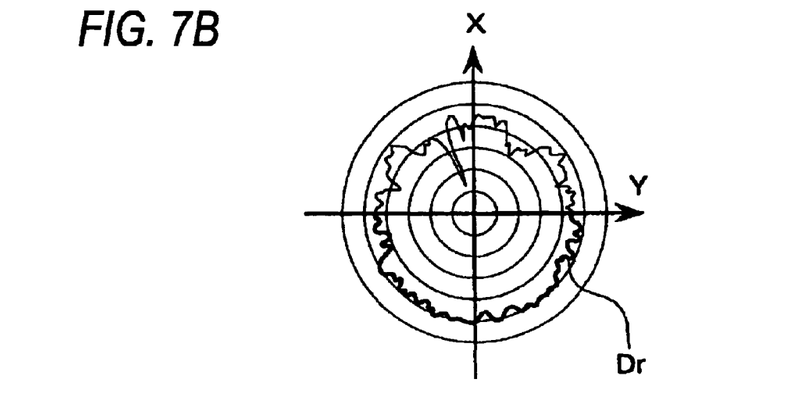
FIG. 7B is a graph showing a sensitivity distribution of the rear plane antenna around a vertical axis.
Figure 7C:
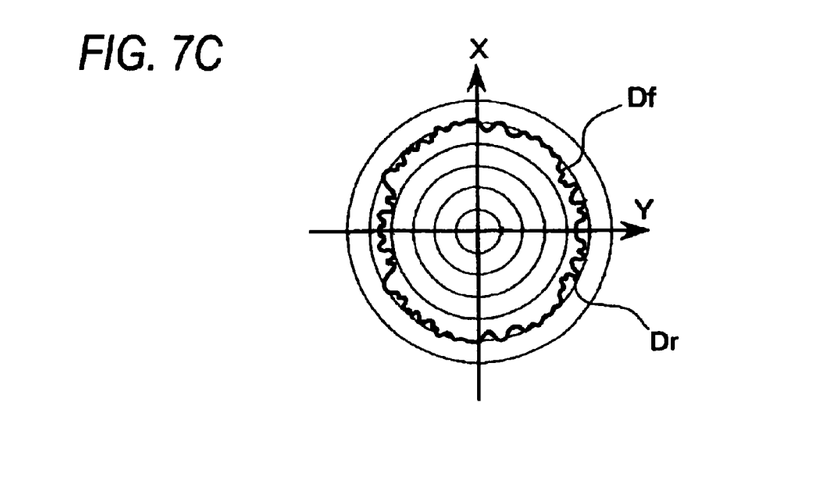
FIG. 7C is a graph showing a sensitivity distribution of the automotive on-board antenna around a vertical axis.

Thus, in a state in which the automotive on-board antenna 10 is actually installed on the vehicle 1, the sensitivity of the automotive on-board antenna 10 for a radio wave having a desired resonant frequency in a plane containing a longitudinal axis X of the vehicle 1 (an X axis shown in FIG. 1) and a lateral axis Y of the vehicle 1 (a Y axis shown in FIG. 1)

comes to exhibit, as shown in FIG. 7C, a characteristic obtained by synthesizing a sensitivity Df which becomes relatively high in a front area as shown in FIG. 7A of sensitivities of the front plane antenna 11 for a radio wave having a desired resonant frequency and a sensitivity Dr which is relatively high in a rear area as shown in FIG. 7B of sensitivities of the rear plane antenna 12 for a radio wave having a desired resonant frequency.

In addition, for example, as shown in FIG. 1, in the event that an angle θf formed by a normal of the front plane antenna 11 and the vertical axis is larger than an angle θr formed by a normal of the rear plane antenna 12 and the vertical axis, in other words, in the event that an inclination angle of the windscreen 2 relative to the vertical direction is larger than that of the rear window glass 3 (θf>θr), in the front plane antenna 11, a sensitivity for a high angle of elevation is relatively improved, whereas in the rear plane antenna 12, a sensitivity for a low angle of elevation is relatively improved.

Figure 8:
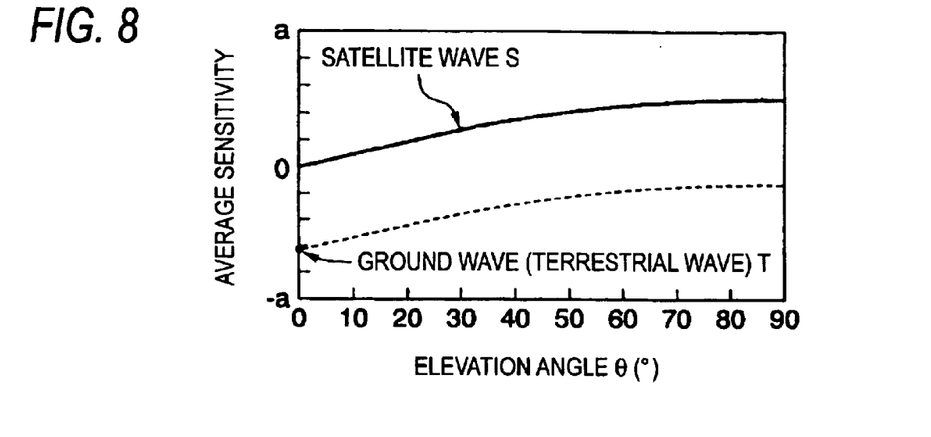
FIG. 8 is a graph showing a change according to elevation angles θ in average value of the sensitivity (average sensitivity) of the rear plane antenna around the vertical axis.

Here, when comparing changes according to elevation angles θ in average sensitivities (namely, average values of sensitivities in all peripheral directions around the vertical axis direction) of the respective plane antennas 11, 12 relative to a satellite wave S of a desired resonant frequency transmitted from, for example, an artificial earth satellite at a relatively high elevation angle, the average sensitivity of the front plane antenna 11 at low angles of elevation is relatively improved when compared to, for example, a change in average sensitivity of the rear plane antenna 12 as shown in FIG. 8.

Namely, the satellite wave S transmitted from the artificial earth satellite located vertically above the vehicle 1 has an appropriate intensity distribution centered on, for example, a maximal value in the vertical axis direction, and the respective plane antennas 11, 12 have appropriate intensity distributions centered on, for example, maximal values in the normal directions thereof. Graphs such as shown in FIG. 8 illustrating the average sensitivities of the respective plane antennas 11, 12 are determined based on the intensity distribution of the satellite wave S and the intensity distributions of the respective plane antennas 11, 12.

For example, while the sensitivity of the rear plane antenna 12 becomes maximum in the normal direction which inclines by the angle θr relative to the vertical axis, the intensity of the satellite wave S which is a target for reception becomes maximum in the vertical axis direction, and as a result, for example, as shown in FIG. 8, the average sensitivity in the vertical axis direction (the angle of elevation θ=90°) becomes maximum, and the average sensitivity changes to decrease as the angle of elevation θ decreases.

Figure 9:
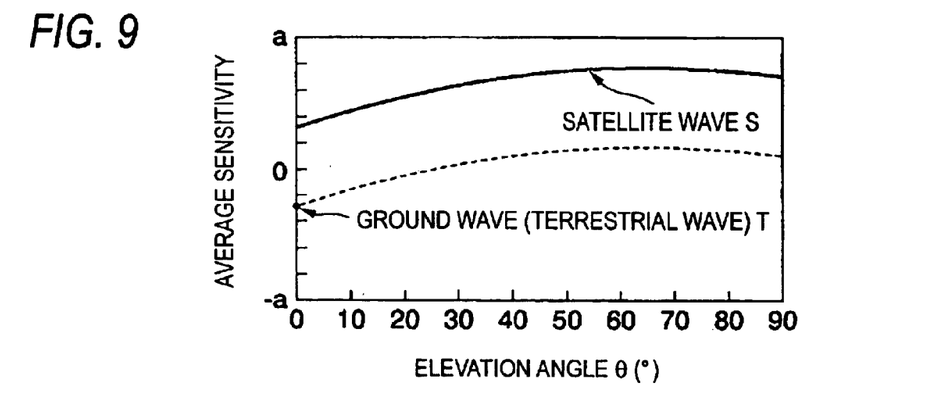
FIG. 9 is a graph showing a change according to elevation angles θ in average value of the sensitivity (average sensitivity) of the automotive on-board antenna around the vertical axis.

Thus, in the automotive on-board antenna 10 for performing diversity transmission and reception by the front plane antenna 11 and the rear plane antenna 12, the elevation angle characteristics for a radio wave of a desired resonant frequency (for example, the satellite wave S transmitted from the artificial earth satellite at the relatively high elevation angle) are improved as shown in, for example, FIG. 9, when compared with a case where the front plane antenna 11 or the rear plane antenna 12 is used solely.

In addition, in FIG. 9, the reason why the average sensitivity decreases relatively at low elevation angles is because the power characteristics of a linearly polarized wave decreases relative to a circularly polarized wave reception of the satellite wave S.

Additionally, as in the case with the satellite wave S, in the automotive on-board antenna 10 for performing diversity transmission and reception by the front plane antenna 11 and the rear plane antenna 12, the average sensitivity for a ground wave (terrestrial wave) T is improved as shown by values of the average sensitivities resulting when the elevation angle θ is zero in FIGS. 8 and 9, when compared with the case where the front plane antenna 11 or the rear plane antenna 12 is used solely.

Figure 10:
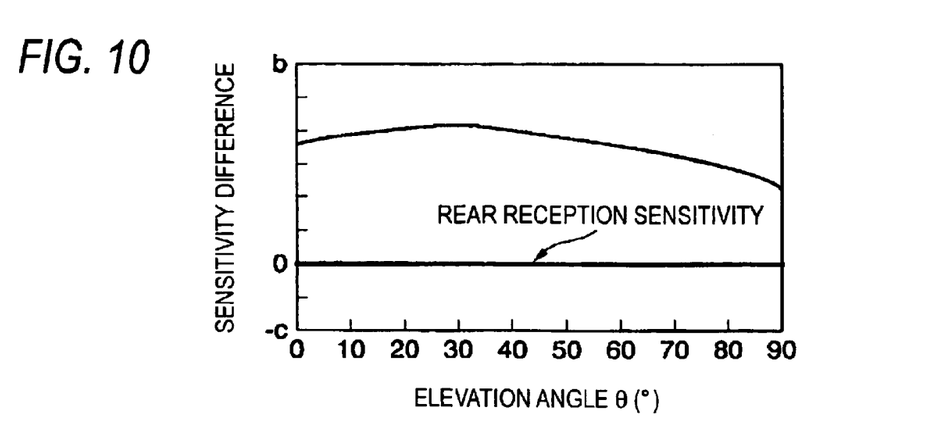
FIG. 10 is a graph showing a change according to elevation angles θ in difference in average sensitivity (average sensitivity difference) around the vertical axis between the automotive on-board antenna and the rear plane antenna.

In addition, FIG. 10 shows a change according to elevation angles θ in difference in average sensitivity (sensitivity difference) between the automotive on-board antenna 10 and the rear plane antenna 12, with a value of the average sensitivity of the rear plane antenna 12 according to elevation angles θ for a radio wave of a desired resonant frequency being a reference value (zero). It is seen from this that the sensitivity of the automotive on-board antenna 10 is improved in every elevation angle direction when compared with a case where the rear plane antenna 12 is used solely.

Note that in FIG. 10, the sensitivity difference resulting when the elevation angle θ is zero is a value for the ground wave (terrestrial wave) T.

As is described heretofore, according to the automotive on-board antenna 10 of the embodiment, by the installation of the diversity system for performing diversity transmission and reception by the front plane antenna 11 and the rear plane antenna 12 which are disposed at the different positions in terms of space and which have the different elevation angle characteristics, the sensitivity characteristics of the automotive on-board antenna 10 can be improved for all peripheral directions of the vehicle 1 (for example, all peripheral directions around the vertical axis of the vehicle) and the elevation angle directions by making effective use of the sensitivity characteristics of the respective plane antennas 11, 12.

In addition, by the provision of the inner cut-out portion 23 in the interior of the first radiation conductor 21, the resonant frequency can be decreased while a desired sensitivity characteristic being secured when compared with a case where no inner cut-out portion 23 is provided. Thus, in securing a desired resonant frequency for the first radiation conductor 21 which is provided with the inner cut-out portion 23, the external size of the first radiation conductor 21 can be reduced when compared with a radiation conductor which is provided no inner cut-out portion 23, whereby the front plane antenna 11 can be made smaller in size.

Namely, the disruption of the vision of the occupant in the vehicle can assuredly be prevented while a desired sensitivity characteristic being secured by disposing the front plane antenna 11 the size of the surface area of which can be decreased by providing therein the inner cut-out portion 23 on the windscreen 2 of the plurality of window glasses of the vehicle 1 which is required to meet a relatively stringent requirement for securing a certain degree of vision for the occupant in the vehicle which is set therefor.

Moreover, the disruption of the vision of the occupant in the vehicle can be prevented more assuredly by disposing the respective plane antennas 11, 12 at the vertically upper positions in the circumferential edge portions 2a, 3a of the respective glasses 2, 3.

In addition, the number of antennas that need to be disposed can be reduced by setting the respective plane antennas 11, 12 so as to receive both satellite waves and ground waves.

Note that while, in the embodiment that is described above, the automotive on-board antenna 10 is constructed so as to include the front plane antenna 11 and the rear plane antenna 12, the invention is not limited thereto and the automotive on-board antenna 10 may be constructed so as to include three or more antennas.

Furthermore, while, in the embodiment that is described above, the respective plane antennas 11, 12 are disposed on the windscreen 2 and the rear window glass 3 of the plurality of window glasses of the vehicle 1, the invention is not limited thereto and the plane antennas may be disposed on the other window glasses of the vehicle 1.

Note that while, in the embodiment that is described above, the front plane antenna 11 which is provided with the inner cut-out portion 23 is disposed on the windscreen 2 and the rear plane antenna 12 which is provided with no inner cut-out portion 23 is disposed on the rear window glass 3, the invention is not limited thereto and an equivalent plane antenna may be disposed on each of the plurality of window glasses of the vehicle 1.

Note that while, in the embodiment that is described above, the respective plane antennas 11, 12 are constructed so as to include the respective radiation conductors 21, 31 which are formed of the conductive films and the respective grounding conductors 22, 32, the invention is not limited thereto and the respective plane antennas 11, 12 may include radiation elements formed of semiconductors instead of the respective radiation conductors 21, 31.

As is described above, according to the automotive on-board antenna of the invention, the sensitivity characteristics of the automotive on-board antenna relative to all peripheral directions of the vehicle (for example, all peripheral directions of the vertical axis of the vehicle) and elevation angle directions can be improved by making effective use of the sensitivity characteristics of the respective antennas.

Furthermore, according to the automotive on-board antenna as set forth in the second aspect of the invention, by the provision of the inner cut-out portion, the resonant frequency can be decreased while a desired sensitivity characteristic being secured when compared with the case where there is provided no inner cut-out portion, whereby in securing a desired resonant frequency with the inner cut-out portion being provided, the respective antennas can be made smaller in size when compared with the case where no inner cut-out portion is provided, and both disrupting the vision of the occupant in the vehicle and damaging the external appearance of the vehicle can be prevented while a desired sensitivity characteristic being secured.

Moreover, according to the automotive on-board antenna as set forth in the fourth aspect of the invention, even if disposed on the windscreen of the plurality of window glasses of the vehicle which is required to meet a relatively stringent requirement for securing a certain degree of vision for the occupant in the vehicle which is set therefor, disrupting the vision of the occupant in the vehicle can be prevented assuredly while a desired sensitivity characteristic being secured.

What is claimed is:

1. An automotive on-board antenna which has a plurality of antennas provided on surfaces of a plurality of window glasses of a vehicle, comprising:

a first antenna including a first radiation element provided on the same surface of one window glass of the plurality of window glasses and a first grounding conductor which surrounds a periphery of an outer edge portion of the first radiation element at a position spaced away outwardly from the outer edge portion of the first radiation element, and a second antenna including a second radiation element provided on the same surface of the other window glass of the plurality of window glasses and a second grounding conductor which surrounds a periphery of an outer edge portion of the second radiation element at a position spaced away outwardly from the edge portion of the second radiation element.

2. The automotive on-board antenna as set forth in claim 1, wherein at least either of the first radiation element and the second radiation element includes an inner cut-out portion for allowing the surface of the associated window glass to be exposed therethrough.

3. The automotive on-board antenna as set forth in claim 1, wherein the plurality of window glasses include a windscreen and a rear window glass.

4. The automotive on-board antenna as set forth in claim 3, wherein at least either of the first radiation element and the second radiation element which include an inner cut-out portion is provided on the surface of the windscreen of the plurality of window glasses.

5. The automotive on-board antenna as set forth in claim 1, wherein the first antenna and the second antenna are disposed on the outer edge portions of the window glasses.

6. The automotive on-board antenna as set forth in claim 1, wherein the first antenna and the second antenna are disposed at vertically upper portions of the window glasses.

7. The automotive on-board antenna as set forth in claim 1, wherein the first antenna and the second antenna constitute a diversity system for performing diversity transmission and reception.

* * * * *